(12) United States Patent
Zhang et al.

(10) Patent No.: US 10,547,423 B2
(45) Date of Patent: Jan. 28, 2020

(54) METHOD AND DEVICE FOR CONFIGURING DOWNLINK CONTROL INFORMATION

(71) Applicant: Alcatel Lucent, Nozay (FR)

(72) Inventors: Qingchuan Zhang, Shanghai (CN); Min Zhang, Swindon (GB)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/751,653

(22) PCT Filed: Jul. 26, 2016

(86) PCT No.: PCT/IB2016/001274
§ 371 (c)(1),
(2) Date: Feb. 9, 2018

(87) PCT Pub. No.: WO2017/025805
PCT Pub. Date: Feb. 16, 2017

(65) Prior Publication Data
US 2018/0234221 A1    Aug. 16, 2018

(30) Foreign Application Priority Data
Aug. 10, 2015    (CN) .......................... 2015 1 0487077

(51) Int. Cl.
*H04L 5/00*    (2006.01)
*H04W 76/27*    (2018.01)
(Continued)

(52) U.S. Cl.
CPC ......... *H04L 5/0048* (2013.01); *H04B 7/0452* (2013.01); *H04B 7/0456* (2013.01);
(Continued)

(58) Field of Classification Search
CPC ... H04L 5/0048; H04L 5/0037; H04L 5/0051; H04L 5/0094; H04B 7/0456; H04B 7/0452; H04W 76/27; H04W 72/042
See application file for complete search history.

(56) References Cited

U.S. PATENT DOCUMENTS 9,001,639 B2 * 4/2015 Wang .................... H04J 13/004
370/208
2010/0296465 A1    11/2010 Hooli et al.
(Continued)

FOREIGN PATENT DOCUMENTS

| CN | 101911580 A | 12/2010 |
| CN | 102083223 A | 6/2011 |

(Continued)

OTHER PUBLICATIONS

International Search Report for PCT/IB2016/001274 dated Nov. 4, 2016.
(Continued)

*Primary Examiner* — Curtis A Alia
(74) *Attorney, Agent, or Firm* — Fay Sharpe LLP (57) ABSTRACT

Embodiments of the present disclosure relate to a method and a device of configuring downlink control information. Specifically, the corresponding demodulation reference signal configuration information is set for three kinds of demodulation reference signal enhancement situations respectively and is indicated by the downlink control information according to the embodiments of the present disclosure. According to one embodiment of the present disclosure, a base station sends the downlink control information to user equipment, the downlink control information including a demodulation reference signal configuration index that indicates the demodulation reference signal configuration information, and the demodulation reference signal configuration information including one item in the demodulation (Continued)

reference signal configuration information set. In the case of using one codebook, the demodulation reference signal configuration information set includes: a first combination set of one layer, the antenna port 11 or 13, and a scrambling sequence number. In the case of using two codebooks, the demodulation reference signal configuration information set includes: a second combination set of two, three, or four layers, at least one of the antenna ports 7, 8, 11, and 13, and a scrambling sequence number.

13 Claims, 1 Drawing Sheet

(51) Int. Cl.
    *H04B 7/0452*     (2017.01)
    *H04B 7/0456*     (2017.01)
    *H04W 72/04*     (2009.01)

(52) U.S. Cl.
    CPC ......... *H04L 5/0094* (2013.01); *H04W 72/042* (2013.01); *H04W 76/27* (2018.02)

(56) References Cited

U.S. PATENT DOCUMENTS

2013/0265980 A1* 10/2013 Zhu .................... H04L 1/06 370/329

2014/0211873 A1* 7/2014 Park .................... H04B 7/0617 375/267
2015/0288497 A1 10/2015 Li et al.

FOREIGN PATENT DOCUMENTS

| CN | 102123014 A | 7/2011 |
|---|---|---|
| CN | 103841644 A | 6/2014 |
| CN | 103997722 A | 8/2014 |
| WO | WO 2012/148207 A2 | 11/2012 |
| WO | WO 2014/069821 A1 | 5/2014 |

OTHER PUBLICATIONS

"3rd Generation Partnership Project; Technical Specification Group Radio Access Network; Study on elevation beamforming / Full-Dimension (FD) Multiple Input Multiple Output (MIMO) for LTE (Release 13)," 3GPP TR 36.897 V13.0.0, pp. 1-58, (Jun. 2015).

"3rd Generation Partnership Project; Technical Specification Group Radio Access Network; Evolved Universal Terrestrial Radio Access (E-UTRA); Multiplexing and channel coding (Release 12)," 3GPP TS 36.212 V12.0.0, (Dec. 2013).

Alcatel Lucent, "Considerations for DMRS Enhancement in 3D MIMO," 3rd Generation Partnership Project (3GPP), 3GPP TSG-RAN WG1 Meeting #81, R1-152663, 4 pages, Fukuoka, Japan, May 25-29, 2015.

* cited by examiner

METHOD AND DEVICE FOR CONFIGURING DOWNLINK CONTROL INFORMATION

TECHNOLOGY

The embodiments of the present disclosure relate to mobile communication technology, and particularly to a method and a device of configuring downlink control information.

BACKGROUND

In LTE release 13, 3GPP has decided to consider the demodulation reference signal (DMRS) enhancement to better support the DL MU-MIMO. In this context, several candidate schemes are proposed to reduce mutual interference among DMRS ports.

Scheme 1: Using 12 DMRS resource elements and an orthogonal cover code (OCC) with the length of four. This scheme allows up to total 4 layers per scrambling sequence.

Scheme 2: Using 24 DMRS resource elements and using OCC with the length of 2. This scheme allows up to total 4 layers per scrambling sequence.

Scheme 2: Using 24 DMRS resource elements and using OCC with the length of four. This scheme allows up to total 8 layers per scrambling sequence.

In schemes 1 and 2, the number of orthogonal antenna ports for MU-MIMO is extended to 4 whereas in scheme 3 the number of the antenna ports is extended to 8.

For the detail implementation and configuration of schemes 1, 2 and 3, those interested readers can take a reference to TR 36.897, Study on Elevation Beamforming/Full-Dimension (FD) MIMO for LTE (Release 13) and TS 36.212, Multiplexing and channel coding (Release 12). The details would be omitted here.

Thus, in Release 13, the orthogonal DMRS port number shared by paired MU-MIMO user equipment (UEs) per scrambling sequence would be extended to 4 or even 8.

Additionally, in LTE specification, eNB sends the DMRS configuration information to UE by using the dynamic downlink control signaling (DCI). However, the current DCI for DMRS configuration only have 3 bits for indicating DMRS configuration information index, and only can support the situation where the orthogonal DMRS port number per scrambling sequence is 2.

Thus, for those alternative schemes above, the DCI in DCI format 2C/2D in the current Release 12 cannot support the extended DMRS configurations. Therefore, it is necessary to define a new DCI to support the above DMRS enhancement.

SUMMARY

For the existing technical problem in the prior art, the embodiments in the present disclosure provide a method and a device of configuring downlink control information.

According to a first aspect of the present disclosure, it is proposed a method of configuring downlink control information in a base station, the downlink control information indicating demodulation reference signal configuration information under demodulation reference signal enhancement, and the base station being configured with a demodulation reference signal configuration information set. The method includes: sending the downlink control information to user equipment, the downlink control information including a demodulation reference signal configuration index that indicates the demodulation reference signal configuration information, and the demodulation reference signal configuration information including one item in the demodulation reference signal configuration information set. In the case of using one codebook, the demodulation reference signal configuration information set includes: a first combination set of one layer, the antenna port 11 or 13 and a scrambling sequence number. In the case that two codebooks are used, the demodulation reference signal configuration information set includes: a second combination set of two, three, or four layers, at least one of the antenna ports 7, 8, 11 and 13, and a scrambling sequence number.

According to a second aspect of the present disclosure, it is proposed a method of configuring downlink control information in user equipment, the downlink control information indicating demodulation reference signal configuration information under demodulation reference signal enhancement, and the user equipment being configured with a demodulation reference signal configuration information set. The method including: receiving the downlink control information from a base station, the downlink control information including a demodulation reference signal configuration index that indicates the demodulation reference signal configuration information, and the demodulation reference signal configuration information including one item in the demodulation reference signal configuration information set. In the case of using one codebook, the demodulation reference signal configuration information set includes: a first combination set of 1 layer, the antenna port 11 or 13 and a scrambling sequence number. In the case that two codebooks are used, the demodulation reference signal configuration information set includes: a second combination set of two, three, or four layers, at least one of the antenna ports 7, 8, 11, and 13, and a scrambling sequence number.

According to a third aspect of the present disclosure, it is proposed a method of configuring downlink control information in a base station, the downlink control information indicating demodulation reference signal configuration information under demodulation reference signal enhancement, and the base station being configured with a demodulation reference signal configuration information set. The method includes: sending the downlink control information to user equipment, the downlink control information including a demodulation reference signal configuration index that indicates the demodulation reference signal configuration information, and the demodulation reference signal configuration information including one item in the demodulation reference signal configuration information set. In the case of using one codebook, the demodulation reference signal configuration information set includes: a first combination set of one layer, the antenna port 9 or 10, and a scrambling sequence number. In the case of using two codebooks, the demodulation reference signal configuration information set includes: a second combination set of two, three, or four layers, at least one of the antenna ports 7, 8, 9 and 10, and a scrambling sequence number.

According to a fourth aspect of the present disclosure, it is proposed a method of configuring downlink control information in user equipment, the downlink control information indicating demodulation reference signal configuration information under demodulation reference signal enhancement, and the user equipment being configured with a demodulation reference signal configuration information set. The method includes: receiving the downlink control information from a base station, the downlink control information including a demodulation reference signal configuration index that indicates the demodulation reference signal configuration information, and the demodulation reference signal configuration information including one item in the demodulation reference signal configuration information set. In the case of using one codebook, the demodulation reference signal configuration information set includes: a first combination set of one layer, the antenna port 9 or 10, and a scrambling sequence number. In the case of using two codebooks, the demodulation reference signal configuration information set includes: a second combination set of two, three, or four layers, at least one of the antenna ports 7, 8, 9, and 10, and a scrambling sequence number.

According to a fifth aspect of the present disclosure, it is proposed a method of configuring downlink control information in a base station, the downlink control information indicating demodulation reference signal configuration information under demodulation reference signal enhancement, and the base station being configured with a demodulation reference signal configuration information set. The method includes: sending the downlink control information to user equipment, the downlink control information including a demodulation reference signal configuration index that indicates the demodulation reference signal configuration information, and the demodulation reference signal configuration information including one item in the demodulation reference signal configuration information set. In the case of using one codebook, the demodulation reference signal configuration information set includes: a first combination set of one layer, the antenna port 7, 8, 9, 10, 11, 12, 13, or 14, and a first scrambling sequence number; any five items in a second combination set of one layer, the antenna port 7, 8, 9, 10, 11, 12, 13, or 14, and a second scrambling sequence number; a third combination set of two, three, or four layers, at least one of the antenna ports 7, 8, 9, and 10. In the case of using two codebooks, the demodulation reference signal configuration information set includes: a fourth combination set of two, three, four, five, six, seven, or eight layers, at least one of the antenna ports 7, 8, 9, 10, 11, 12, 13, and 14 and a scrambling sequence number.

According to a sixth aspect of the present disclosure, it is proposed a method of configuring downlink control information in user equipment, the downlink control information indicating demodulation reference signal configuration information under demodulation reference signal enhancement, and the user equipment being configured with a demodulation reference signal configuration information set. The method includes: receiving the downlink control information from a base station, the downlink control information including a demodulation reference signal configuration index that indicates the demodulation reference signal configuration information, and the demodulation reference signal configuration information including one item in the demodulation reference signal configuration information set. In the case of using one codebook, the demodulation reference signal configuration information set includes: a first combination set of 1 layer, the antenna port 7, 8, 9, 10, 11, 12, 13 or 14 and a first scrambling sequence number; any five items in a second combination set of 1 layer, the antenna port 7, 8, 9, 10, 11, 12, 13 or 14 and a second scrambling sequence number; a third combination set of 2, 3 or 4 layers, at least one of the antenna ports 7, 8, 9, and 10. In the case of using two codebooks, the demodulation reference signal configuration information set includes: a fourth combination set of 2, 3, 4, 5, 6, 7, or 8 layers, at least one of the antenna ports 7, 8, 9, 10, 11, 12, 13, and 14 and a scrambling sequence number.

Through the embodiments of the present disclosure, it is proposed a new DCI, which requires 1-bit size increasing compared with the current DCI, to support the potential possible DMRS enhancement solutions. Besides, the corresponding DMRS configuration information (the antenna port, the scrambling sequence number (also referred to as the scrambling sequence ID), and a number of layers) is provided for those possible DMRS enhancement solutions respectively. Therefore, the high-order MU-MIMO with DMRS enhancement can be better supported through the embodiments of the present disclosure. And in the meanwhile the at least following technical effects are achieved: supporting both SU/MU, compatible with legacy UEs and minimizing the DCI overhead with only increasing 1 bit.

BRIEF DESCRIPTION OF THE DRAWINGS

Other features, objects and advantages of the invention will become more apparent upon review of the following detailed description of non-limiting embodiments taken with reference to the drawings in which.

In the drawings, identical or like reference numerals denote identical or corresponding components or features throughout the different FIGURES.

DETAILED DESCRIPTION

Herein, a new DCI is proposed for scheme 1 in the background. Compared with previous 3 bits, this DCI includes additional one bit, that is, 4 bits to indicate DMRS configuration information.

In scheme 1 in the background, UE is configured to use the antenna ports 7, 8, 11, 13 per scrambling sequence, and use OCC with the length of four. Each UE can have a 1/2/3/4-layer transmission mode. In this new DCI, the antenna port and the scrambling sequence ID associated with the respective transmission mode will be indicated.

For the DCI design for scheme 1, in some cases, it is necessary to inform UE of using OCC with the length of four to perform channel estimation. This can be implemented by defining new DMRS antenna ports 7' and 8' or setting new indication information and etc., for example (which would be discussed in detail below).

This is because that in scheme 1, if only using the original antenna port 7, UE does not know whether there are other MU UEs paired with itself. In other words, UE cannot judge whether to use OCC with the length of 2 or length 4 to perform the channel estimation. This may cause significant performance loss. In the following, one example is given for illustration.

Supposing now there are 4 MU UEs with DMRS antenna ports defined by scheme 1. The received signal at a single receiving antenna of UE#1, to which the antenna port 7 is assigned, can be given by:

$$y_{UE_1} = \begin{bmatrix} 1 \\ 1 \\ 1 \\ 1 \end{bmatrix} h_{UE_1}^T w_{UE_1} + \begin{bmatrix} 1 \\ -1 \\ 1 \\ -1 \end{bmatrix} h_{UE_1}^T w_{UE_2} +$$

$$\begin{bmatrix} 1 \\ 1 \\ -1 \\ -1 \end{bmatrix} h_{UE_1}^T w_{UE_3} + \begin{bmatrix} 1 \\ -1 \\ -1 \\ 1 \end{bmatrix} h_{UE_1}^T w_{UE_4}$$

where $h_{UE1}^T$ is the channel vector of UE#1, and $w_{UE1}, \ldots w_{UE4}$ are the precoding matrix for UE#1, 2, 3, 4 respectively. Since UE#1 does not know whether there are other MU UEs, then UE may use OCC with the length of 2 ([1 1], for example) to perform the channel estimation. The channel estimates for two slots can then be expressed by:

$$\hat{g}_{UE1,slot1} = h_{UE1}^T w_{UE1} + h_{UE1}^T w_{UE3}$$

$$\hat{g}_{UE1,slot2} = h_{UE1}^T w_{UE1} - h_{UE1}^T w_{UE3}$$

The real channel UE#1 wants to know is $\hat{g}_{UE1,slot1} = \hat{g}_{UE1,slot2} = h_{UE1}^T w_{UE1} +$. However, with the above channel estimates respectively for two slots, it is very likely for UE#1 to take the interfering terms $\pm h_{UE1}^T w_{UE2}$ as the channel variations, which are then tracked when performing the Physical Downlink Shared Channel (PDSCH) decoding. Such a misunderstanding is very likely to happen, if only the antenna port 7 is used regardless of SU or MU which is actually applied. Consequently, the channel estimation would suffer from strong interference.

Thus, based on the above analysis, according to an embodiment of the present disclosure, new antenna ports 7' and 8' are defined. The location of the resource elements used by the antenna ports 7' and 8' is the same as antenna ports 7 and 8, respectively. Those two new antenna ports will indicate UE to use the OCC with the length of four to perform the channel estimation, so as to eliminate the interference from other MU UEs.

It should be appreciated for those skilled in the art that the naming of the antenna ports (namely, 7' and 8') is only exemplary but not limited.

Alternatively, instead of defining new antenna ports, through other ways, such as configuring the corresponding indication information, UE is indicated to use the OCC with the length of four to perform the channel estimation, so as to eliminate the interference from other MU UEs.

It should be appreciated for those skilled in the art that the above two examples are only exemplary but not limited. Thus, other implementations for informing UE of using the OCC with the length of four to perform the channel estimation are not excluded.

According to one embodiment of the present disclosure, a DMRS configuration information set/table is configured at the base station and UE side, respectively, as shown in Table 1.

The left side in Table 1 shows the DMRS configuration information set in the case of one codebook, and the right side in Table 1 shows the DMRS configuration information set in the case of two codebooks. Herein, for each situation, the above 15 kinds of DMRS configuration information can be indicated by 4 bits, respectively.

Compared with original DMRS configuration information (TS 36.212, Multiplexing and channel coding (Release 12), for example), the above table has additional new DMRS configuration information. In the case of one codebook, those new DMRS configuration information include: {1 layer, antenna port 7', $n_{SCID}$=0 or 1; 1 layer, antenna port 8', $n_{SCID}$=0 or 1; 1 layer, antenna port 11, $n_{SCID}$=0 or 1; 1 layer, antenna port 13, $n_{SCID}$=0 or 1}.

When using two codebooks, those new DMRS configuration information include: {2 layers, antenna ports 7' and 8', $n_{SCID}$=0 or 1; 2 layers, antenna ports 11 and 13, $n_{SCID}$=0 or 1; 3 layers, antenna ports 7', 8' and 11, $n_{SCID}$=0 or 1; 4 layers, antenna ports 7', 8', 11 and 13, $n_{SCID}$=0 or 1}. Herein, $n_{SCID}$ is the ID of the scrambling sequence.

In this embodiment, UE is informed of using the OCC with the length of four by defining new antenna ports 7' and 8'. In another embodiment of the present disclosure, instead of new defined antenna ports, the form of {1 layer, antenna port 7, $n_{SCID}$=0, indication information} is used to indicate UE, for example. Herein, the indication information indicates UE to use the OCC with the length of four to perform the channel estimation.

This solution is very advantageous for MU mode with low mobility and SU mode with high mobility.

Alternatively, according to another embodiment of the present disclosure, for scheme 1, it may be not necessary to inform UE of using the OCC with the length of four, or to define new antenna ports 7' and 8', or to insert the above indication information.

For example, if the new defined DCI format is only used to support low-mobility scenario, the above embodiment can be adopted.

Table 2 shows the corresponding DMRS configuration information set/table under this situation.

TABLE 1

| | One Codebook<br>Codebook 0 enabled<br>Codebook 1 disabled | | Two Codebooks<br>Codebook 0 enabled,<br>Codebook 1 enabled |
|---|---|---|---|
| Value | DMRS configuration information | Value | DMRS configuration information |
| 0 | 1 layer, antenna port 7, $n_{SCID}$ = 0 | 0 | 2 layers, antenna ports 7-8, $n_{SCID}$ = 0 |
| 1 | 1 layer, antenna port 7, $n_{SCID}$ = 1 | 1 | 2 layers, antenna ports 7-8, $n_{SCID}$ = 1 |
| 2 | 1 layer, antenna port 8, $n_{SCID}$ = 0 | 2 | 2 layers, antenna ports 7'-8', $n_{SCID}$ = 0 |
| 3 | 1 layer, antenna port 8, $n_{SCID}$ = 1 | 3 | 2 layers, antenna ports 7'-8', $n_{SCID}$ = 1 |
| 4 | 1 layer, antenna port 7', $n_{SCID}$ = 0 | 4 | 2 layers, antenna ports 11 13, $n_{SCID}$ = 0 |
| 5 | 1 layer, antenna port 7', $n_{SCID}$ = 1 | 5 | 2 layers, antenna ports 11 13, $n_{SCID}$ = 1 |
| 6 | 1 layer, antenna port 8', $n_{SCID}$ = 0 | 6 | 3 layers, antenna ports 7' 8' 11, $n_{SCID}$ = 0 |
| 7 | 1 layer, antenna port 8', $n_{SCID}$ = 1 | 7 | 3 layers, antenna ports 7' 8' 11, $n_{SCID}$ = 1 |
| 8 | 1 layer, antenna port 11, $n_{SCID}$ = 0 | 8 | 4 layers, antenna ports 7' 8' 11 13, $n_{SCID}$ = 0 |
| 9 | 1 layer, antenna port 11, $n_{SCID}$ = 1 | 9 | 4 layers, antenna ports 7' 8' 11 13, $n_{SCID}$ = 1 |
| 10 | 1 layer, antenna port 13, $n_{SCID}$ = 0 | 10 | 3 layers, antenna ports 7-9 |
| 11 | 1 layer, antenna port 13, $n_{SCID}$ = 1 | 11 | 4 layers, antenna ports 7-10 |
| 12 | 2 layers, antenna ports 7-8 | 12 | 5 layers, antenna ports 7-11 |
| 13 | 3 layers, antenna ports 7-9 | 13 | 6 layers, antenna ports 7-12 |
| 14 | 4 layers, antenna ports 7-10 | 14 | 7 layers, antenna ports 7-13 |
| 15 | Reserved | 15 | 8 layers, antenna ports 7-14 |

TABLE 2

| One Codebook Codebook 0 enabled Codebook 1 disabled | | Two Codebooks Codebook 0 enabled, Codebook 1 enabled | |
|---|---|---|---|
| Value | DMRS configuration information | Value | DMRS configuration information |
| 0 | 1 layer, antenna port 7, $n_{SCID} = 0$ | 0 | 2 layers, antenna ports 7-8, $n_{SCID} = 0$ |
| 1 | 1 layer, antenna port 7, $n_{SCID} = 1$ | 1 | 2 layers, antenna ports 7-8, $n_{SCID} = 1$ |
| 2 | 1 layer, antenna port 8, $n_{SCID} = 0$ | 2 | 2 layers, antenna ports 11 13, $n_{SCID} = 0$ |
| 3 | 1 layer, antenna port 8, $n_{SCID} = 1$ | 3 | 2 layers, antenna ports 11 13, $n_{SCID} = 1$ |
| 4 | 1 layer, antenna port 11, $n_{SCID} = 0$ | 4 | 3 layers, antenna ports 7 8 11 $n_{SCID} = 0$ |
| 5 | 1 layer, antenna port 11, $n_{SCID} = 1$ | 5 | 3 layers, antenna ports 7 8 11 $n_{SCID} = 1$ |
| 6 | 1 layer, antenna port 13, $n_{SCID} = 0$ | 6 | 4 layers, antenna ports 7 8 11 13 $n_{SCID} = 0$ |
| 7 | 1 layer, antenna port 13, $n_{SCID} = 1$ | 7 | 4 layers, antenna ports 7 8 11 13 $n_{SCID} = 1$ |
| 8 | 2 layers, antenna ports 7-8 | 8 | 3 layers, antenna ports 7-9 |
| 9 | 3 layers, antenna ports 7-9 | 9 | 4 layers, antenna ports 7-10 |
| 10 | 4 layers, antenna ports 7-10 | 10 | 5 layers, antenna ports 7-11 |
| 11 | Reserved | 11 | 6 layers, antenna ports 7-12 |
| 12 | Reserved | 12 | 7 layers, antenna ports 7-13 |
| 13 | Reserved | 13 | 8 layers, antenna ports 7-14 |
| 14 | Reserved | 14 | Reserved |
| 15 | Reserved | 15 | Reserved |

Compared with Table 1, in Table 2, the antenna ports 7 and 7' are combined, and the antenna ports 8 and 8' are combined. Herein, for UE with low-mobility, the OCC with the length of four will be always used for the antenna ports 7 and 8. Of course, if the requirement for the accuracy of the channel estimation is not so high, this embodiment can also be adopted for the UE with high-mobility.

Figure 1:
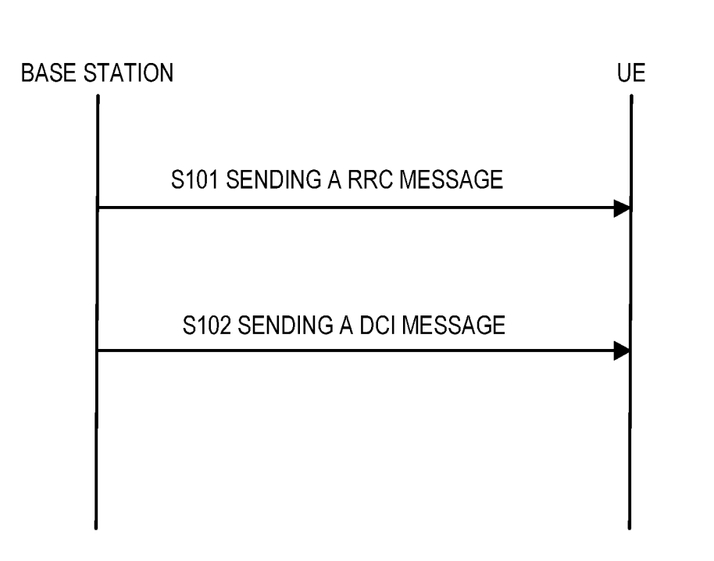
FIG. 1 shows a system method flowchart of configuring DCI for DMRS enhancement according to one embodiment of the disclosure.

Then, as shown in FIG. 1, in step S102, the base station sends DCI to UE. The DCI includes a DMRS configuration index (i.e. "value" in the above tables), which is used to indicate the corresponding DMRS configuration information.

Additionally, as shown in step S101, before sending the above DCI, the base station can send a radio resource control (RRC) message to UE, which indicates that the base station adopts the DMRS enhancement of scheme 1 in the background. Additionally, the RRC message further indicates UE whether to implement the DMRS configuration information mode shown in Table 1 or Table 2.

Then, a new DCI is proposed for scheme 2 in the background. Compared with previous 3 bits, the DCI includes 4 bits to indicate the DMRS configuration information. For the situation for scheme 2, the antenna ports 7/8/9/10 using the OCC with the length of 2 should be indicated together with the associated layer and a scrambling sequence ID.

For scheme 2, in some cases, it is also necessary to define new antenna ports or add additional indication information. This is because in SU mode the antenna ports 7/8 can be used and the PDSCH mapping is performed based on the fact that there are in total 12 DMRS resource elements. However, for MU mode, the antenna ports 7/8 still would be used but the PDSCH mapping should be performed based on the case of 24 DMRS resource elements. This means the resource element locations of the antenna ports 7/8/9/10 should be punctured when demodulating PDSCH. Therefore, if only the antenna ports 7/8 are used, UE cannot judge how to perform the resource element puncturing for PDSCH mapping. To solve this problem, the following proposal is adopted.

New antenna ports 7" and 8" are defined. The locations of those antenna ports are identical with those of the antenna ports 7 and 8, respectively, and those antenna ports indicate UE to puncture physical resource element locations of the antenna ports 7 to 10 when demodulating PDSCH. Thus, UE can be informed that there are total 24 DMRS resource elements, and thus requires a double amount of PDSCH puncturing. It should be appreciated for those skilled in the art that the naming of the antenna ports (namely, 7" and 8") is only exemplary but not limited.

Of course, instead of setting new antenna ports 7" and 8", UE can be informed that a double amount of PDSCH puncturing is required through the form of indication information.

It should be appreciated for those skilled in the art that the above two examples are only exemplary but not limited.

A DMRS configuration information set/table is configured at the base station and UE side, respectively, as shown in Table 3.

TABLE 3

| One Codebook Codebook 0 enabled Codebook 1 disabled | | Two Codebooks Codebook 0 enabled, Codebook 1 enabled | |
|---|---|---|---|
| Value | DMRS configuration information | Value | DMRS configuration information |
| 0 | 1 layer, antenna port 7, $n_{SCID} = 0$ | 0 | 2 layers, antenna ports 7-8, $n_{SCID} = 0$ |
| 1 | 1 layer, antenna port 7, $n_{SCID} = 1$ | 1 | 2 layers, antenna ports 7-8, $n_{SCID} = 1$ |
| 2 | 1 layer, antenna port 8, $n_{SCID} = 0$ | 2 | 2 layers, antenna ports 7"-8", $n_{SCID} = 0$ |
| 3 | 1 layer, antenna port 8, $n_{SCID} = 1$ | 3 | 2 layers, antenna ports 7"-8", $n_{SCID} = 1$ |

TABLE 3-continued

| | One Codebook Codebook 0 enabled Codebook 1 disabled | | Two Codebooks Codebook 0 enabled, Codebook 1 enabled |
|---|---|---|---|
| Value | DMRS configuration information | Value | DMRS configuration information |
| 4 | 1 layer, antenna port 7'', $n_{SCID}$ = 0 | 4 | 2 layers, antenna ports 9-10, $n_{SCID}$ = 0 |
| 5 | 1 layer, antenna port 7'', $n_{SCID}$ = 1 | 5 | 2 layers, antenna ports 9-10, $n_{SCID}$ = 1 |
| 6 | 1 layer, antenna port 8'', $n_{SCID}$ = 0 | 6 | 3 layers, antenna ports 7-9, $n_{SCID}$ = 0 |
| 7 | 1 layer, antenna port 8'', $n_{SCID}$ = 1 | 7 | 3 layers, antenna ports 7-9, $n_{SCID}$ = 1 |
| 8 | 1 layer, antenna port 9, $n_{SCID}$ = 0 | 8 | 4 layers, antenna ports 7-10, $n_{SCID}$ = 0 |
| 9 | 1 layer, antenna port 9, $n_{SCID}$ = 1 | 9 | 4 layers, antenna ports 7-10, $n_{SCID}$ = 1 |
| 10 | 1 layer, antenna port 10, $n_{SCID}$ = 0 | 10 | 5 layers, antenna ports 7-11 |
| 11 | 1 layer, antenna port 10, $n_{SCID}$ = 1 | 11 | 6 layers, antenna ports 7-12 |
| 12 | 2 layers, antenna ports 7-8 | 12 | 7 layers, antenna ports 7-13 |
| 13 | 3 layers, antenna ports 7-9 | 13 | 8 layers, antenna ports 7-14 |
| 14 | 4 layers, antenna ports 7-10 | 14 | Reserved |
| 15 | Reserved | 15 | Reserved |

Compared with original DMRS configuration information, the above table has additional new DMRS configuration information. In the case of one codebook, those new DMRS configuration information include: {1 layer, antenna port 7'', $n_{SCID}$=0 or 1; 1 layer, antenna port 8'', $n_{SCID}$=0 or 1; 1 layer, antenna port 9, $n_{SCID}$=0 or 1; 1 layer, antenna port 10, $n_{SCID}$=0 or 1}. In the case of two codebooks, those new DMRS configuration information include: {2 layers, antenna ports 7'' and 8'', $n_{SCID}$=0 or 1; 2 layers, antenna ports 9 and 10, $n_{SCID}$=0 or 1; 3 layers, antenna ports 7 to 9, $n_{SCID}$=1; 4 layers, antenna ports 7 to 10, $n_{SCID}$=1}.

In the above table, UE is informed that a double amount of PDSCH puncturing is required through new defined antenna ports 7'' and 8''. In another embodiment of the present disclosure, instead of new defined antenna ports, the form of {1 layer, antenna port 7, $n_{SCID}$=0, indication information} is used to indicate UE, for example. Herein, the indication information indicates UE to puncture physical resource element locations of antenna ports 7 to 10 when demodulating PDSCH.

It should be noted, even if UE does not know extra puncturing is required, it is still possible for UE to successfully decode the overall PDSCH. Although in this situation the performance would be reduced, if such performance degradation can be tolerated, then it is not necessary to inform UE that extra puncturing is required. This means it is not necessary to set new antenna ports 7'' and 8'' (antenna ports 7 and 7'' can be combined, and antenna ports 8 and 8'' can be combined.) or it is not necessary to insert the above additional indication information.

Thus, in another embodiment of the present disclosure, the base station will not inform UE that the extra puncturing is required. Table 4 shows a corresponding DMRS configuration information set/table under this situation.

TABLE 4

| | One Codebook Codebook 0 enabled Codebook 1 disabled | | One Codebook Codebook 0 enabled, Codebook 1 enabled |
|---|---|---|---|
| Value | DMRS configuration information | Value | DMRS configuration information |
| 0 | 1 layer, antenna port 7, $n_{SCID}$ = 0 | 0 | 2 layers, antenna ports 7-8, $n_{SCID}$ = 0 |
| 1 | 1 layer, antenna port 7, $n_{SCID}$ = 1 | 1 | 2 layers, antenna ports 7-8, $n_{SCID}$ = 1 |
| 2 | 1 layer, antenna port 8, $n_{SCID}$ = 0 | 2 | 2 layers, antenna ports 9-10, $n_{SCID}$ = 0 |
| 3 | 1 layer, antenna port 8, $n_{SCID}$ = 1 | 3 | 2 layers, antenna ports 9-10, $n_{SCID}$ = 1 |
| 4 | 1 layer, antenna port 9, $n_{SCID}$ = 0 | 4 | 3 layers, antenna ports 7-9, $n_{SCID}$ = 0 |
| 5 | 1 layer, antenna port 9, $n_{SCID}$ = 1 | 5 | 3 layers, antenna ports 7-9, $n_{SCID}$ = 1 |
| 6 | 1 layer, antenna port 10, $n_{SCID}$ = 0 | 6 | 4 layers, antenna ports 7-10, $n_{SCID}$ = 0 |
| 7 | 1 layer, antenna port 10, $n_{SCID}$ = 1 | 7 | 4 layers, antenna ports 7-10, $n_{SCID}$ = 1 |
| 8 | 2 layers, antenna ports 7-8 | 8 | 5 layers, antenna ports 7-11 |
| 9 | 3 layers, antenna ports 7-9 | 9 | 6 layers, antenna ports 7-12 |
| 10 | 4 layers, antenna ports 7-10 | 10 | 7 layers, antenna ports 7-13 |
| 11 | Reserved | 11 | 8 layers, antenna ports 7-14 |
| 12 | Reserved | 12 | Reserved |
| 13 | Reserved | 13 | Reserved |
| 14 | Reserved | 14 | Reserved |
| 15 | Reserved | 15 | Reserved |

Compared with Table 3, in Table 4, the antenna ports 7 and 7'' are combined, and the antenna ports 8 and 8'' are combined. That is, UE will not be informed that the physical resource element locations of the antenna ports 7 to 10 are required to be punctured.

Then, as shown in FIG. 1, in step S102, the base station sends DCI to UE. The DCI includes a DMRS configuration index (i.e. "value" in the above tables), which is used to indicate the DMRS configuration information.

Additionally, as shown in step S101, before sending the above DCI, the base station can send a RRC message to UE, which indicates that the base station adopts the DMRS enhancement of scheme 2 in the background. Additionally, the RRC message further indicates UE whether to implement the DMRS configuration information mode shown in Table 3 or Table 4.

In the above two kinds of DMRS enhancement, compared with scheme 2 in the background, scheme 1 requires lower DMRS overhead and therefore alternative scheme 1 is more preferable. However, regarding the compatibility with legacy UEs, the situation is different. Since the legacy UEs can only use OCC with the length of 2 to perform the DMRS based channel estimation for MU-MIMO, the interference from Release 13 UEs using scheme 1 with the OCC with the length of four shall lead to a non-ignorable performance loss for legacy UEs. In contrast, for scheme 2, there is no such interference. If there is need to pair legacy UEs with Release 13 UEs, the base station should perform additional PDSCH puncturing on the other twelve physical resource elements for legacy UE. Although legacy UE does not know this extra puncturing, the overall PDSCH may still be decodable. Thus, in the situation in which legacy UE is considered, scheme 2 is more preferable. Based on this background, in one embodiment of the present disclosure, the base station can use one additional RRC message to indicate the following DCI is based on scheme 1 or scheme 2. For the MU MIMO supporting purely Release UE, this RRC message can be configured to indicate whether the DCI supports scheme, which is based on Table 1, or scheme, which is based on Table 2, for scheme 1 in the background, for example. If it is required to perform MU MIMO paring between legacy UEs and Release 13 UEs, the RRC message can be further configured to indicate whether the DCI supports scheme, which is based on Table 3, or scheme, which is based on Table 4, for scheme 2 in the background, for example.

Finally, a new DCI is proposed for scheme 3 in the background. In scheme 3, orthogonal antenna ports will be extended to 8/scrambling sequence. Herein, the DCI will be set with the consideration of DCI overhead and the realistic MU pairing number. Herein, DCI will still use 4 bits, rather than 3 bits in Release 12.

Table 5 shows a corresponding DMRS configuration information set/table under this situation.

configuration information in {1 layer, antenna ports 7, 8, 9, 10, 11, 12, 13 or 14, $n_{SCID}$=1}; and 3 DMRS configuration information {2 layers, antenna ports 7-8; 3 layers, antenna ports 7-9; 4 layers, antenna ports 7-10}.

In the case of two codebooks, 4-bit DCI can indicate the following 16 kinds of DMRS configuration information: 14 DMRS configuration information, namely {2 layers, antenna ports 7, 8, 9, 10, 11, 12 13 or 14, $n_{SCID}$=0 or 1; 3 layers, antenna ports 7-9; 4 layers, antenna ports 7 to 10; 5 layers, antenna ports 7 to 11; 6 layers, antenna ports 7 to 12; 7 layers, antenna ports 7 to 13; 8 ↑ layers, antenna ports 7 to 14}. The rest two DMRS configuration information can be {3 layers, antenna ports 7, 8, 11; 3 layers, antenna ports 9, 10, 12} or {4 layers, antenna ports 7, 8, 11, 13; 4 layers, antenna ports 9, 10, 12, 14}.

Then, as shown in FIG. 1, in step S102, the base station sends DCI to UE. The DCI includes a DMRS configuration index (i.e. "value" in the above tables), which is used to indicate the DMRS configuration information.

It shall be appreciated that the foregoing embodiments are merely illustrative but will not limit the invention. Any technical solutions without departing from the spirit of the invention shall fall into the scope of invention, including that different technical features, methods appearing in different embodiments are used to combine to advantage. Further, any reference numerals in the claims cannot be recognized as limiting the related claims; the term "comprise" will not preclude another apparatus or step which does not appear in other claims or the description.

We claim:

1. A method of configuring downlink control information in a base station, the downlink control information indicating demodulation reference signal configuration information under demodulation reference signal enhancement, and the base station being configured with a demodulation reference signal configuration information set, the method comprising:

sending the downlink control information to user equipment, the downlink control information including a

TABLE 5

| One Codebook Codebook 0 enabled Codebook 1 disabled | | Two Codebooks Codebook 0 enabled, Codebook 1 enabled | |
|---|---|---|---|
| Value | DMRS configuration information | Value | DMRS configuration information |
| 0 | 1 layer, antenna port 7, $n_{SCID}$ = 0 | 0 | 2 layers, antenna ports 7-8, $n_{SCID}$ = 0 |
| 1 | 1 layer, antenna port 7, $n_{SCID}$ = 1 | 1 | 2 layers, antenna ports 7-8, $n_{SCID}$ = 1 |
| 2 | 1 layer, antenna port 8, $n_{SCID}$ = 0 | 2 | 2 layers, antenna ports 11 13, $n_{SCID}$ = 0 |
| 3 | 1 layer, antenna port 8, $n_{SCID}$ = 1 | 3 | 2 layers, antenna ports 11 13, $n_{SCID}$ = 1 |
| 4 | 1 layer, antenna port 11, $n_{SCID}$ = 0 | 4 | 2 layers, antenna ports 9-10, $n_{SCID}$ = 0 |
| 5 | 1 layer, antenna port 11, $n_{SCID}$ = 1 | 5 | 2 layers, antenna ports 9-10, $n_{SCID}$ = 1 |
| 6 | 1 layer, antenna port 13, $n_{SCID}$ = 0 | 6 | 2 layers, antenna ports 12 14, $n_{SCID}$ = 0 |
| 7 | 1 layer, antenna port 13, $n_{SCID}$ = 1 | 7 | 2 layers, antenna ports 12 14, $n_{SCID}$ = 1 |
| 8 | 1 layer, antenna port 9, $n_{SCID}$ = 0 | 8 | 3 layers, antenna ports 7-9 |
| 9 | 1 layer, antenna port 9, $n_{SCID}$ = 1 | 9 | 3 layers, antenna ports 7 8 11 |
| 10 | 1 layer, antenna port 10 | 10 | 3 layers, antenna ports 9 10 12 |
| 11 | 1 layer, antenna port 12 | 11 | 4 layers, antenna ports 7-10 |
| 12 | 1 layer, antenna port 14 | 12 | 5 layers, antenna ports 7-11 |
| 13 | 2 layers, antenna ports 7-8 | 13 | 6 layers, antenna ports 7-12 |
| 14 | 2 layers, antenna ports 7-9 | 14 | 7 layers, antenna ports 7-13 |
| 15 | 4 layers, antenna ports 7-10 | 15 | 8 layers, antenna ports 7-14 |

As shown in Table 5, compared with original DMRS configuration information, the above table has additional new DMRS configuration information.

In the case of one codebook, 4-bit DCI can indicate the following 16 kinds of DMRS configuration information: 8 DMRS configuration information, namely {1 layer, antenna ports 7, 8, 9, 10, 11, 12, 13 or 14, $n_{SCID}$=0}; any five DMRS demodulation reference signal configuration index that indicates the demodulation reference signal configuration information, the demodulation reference signal configuration information including an item in the demodulation reference signal configuration information set, in the case of using one codebook, the demodulation reference signal configuration information set including a first combination set of one layer, the antenna port 11 or 13, and a scrambling sequence number, wherein the first combination set includes:
one layer, the antenna port 11, and a first scrambling sequence number,
one layer, the antenna port 11, and a second scrambling sequence number,
one layer, the antenna port 13, and a first scrambling sequence number, and
one layer, the antenna port 13, and a second scrambling sequence number;
in the case of using two codebooks, the demodulation reference signal configuration information set including a second combination set of two, three, or four layers, at least one of the antenna ports 7, 8, 11, and 13, and a scrambling sequence number, wherein the second combination set includes:
two layers, the antenna ports 11 and 13, and a first scrambling sequence number,
two layers, the antenna ports 11 and 13, and a second scrambling sequence number,
three layers, the antenna ports 7, 8, and 11, and a first scrambling sequence number,
three layers, the antenna ports 7, 8, and 11, and a second scrambling sequence number,
four layers, the antenna ports 7, 8, 11, and 13, and a first scrambling sequence number, and
four layers, the antenna ports 7, 8, 11 and 13, and a second scrambling sequence number.

2. The method according to claim 1, wherein in the case of using one codebook, the demodulation reference signal configuration information set further includes:
one layer, the antenna port 7, a first scrambling sequence number, and indication information,
one layer, the antenna port 7, a second scrambling sequence number, and indication information,
one layer, the antenna port 8, a first scrambling sequence number, and indication information, and
one layer, the antenna port 8, a second scrambling sequence number, and indication information;
wherein in the case of using two codebooks, the demodulation reference signal configuration information set further includes:
two layers, the antenna ports 7 and 8, a first scrambling sequence number, and indication information, and
two layers, the antenna ports 7 and 8, a second scrambling sequence number, and indication information; and
wherein the indication information indicates the user equipment to use an orthogonal cover code with the length of four to perform channel estimation.

3. The method according to claim 1, wherein in the case of using one codebook, the demodulation reference signal configuration information set further includes:
one layer, the antenna port 7', and a first scrambling sequence number,
one layer, the antenna port 7', and a second scrambling sequence number,
one layer, the antenna port 8', and a first scrambling sequence number, and
one layer, the antenna port 8', and a second scrambling sequence number;
wherein in the case that two codebooks are used, the demodulation reference signal configuration information set further includes:
two layers, the antenna ports 7' and 8', and a first scrambling sequence number, and
two layers, the antenna ports 7' and 8', and a second scrambling sequence number; and
wherein the location of the antenna port 7' is the same as the location of the antenna port 7, the location of the antenna port 8' is the same as the location of the antenna port 8, and the antenna port 7' and the antenna port 8' indicate the user equipment to use an orthogonal cover code with the length of four to perform channel estimation, respectively.

4. The method according to claim 1, wherein in the case of using one codebook, the demodulation reference signal configuration information set further includes:
one layer, the antenna port 7, and a first scrambling sequence number,
one layer, the antenna port 7, and a second scrambling sequence number,
one layer, the antenna port 8, and a first scrambling sequence number,
one layer, the antenna port 8, and a second scrambling sequence number,
two layers and the antenna ports 7 and 8,
three layers and the antenna ports 7 to 9, and
four layers and the antenna ports 7 to 10; and
wherein in the case of using two codebooks, the demodulation reference signal configuration information set further includes:
three layers and the antenna ports 7 to 9,
four layers and the antenna ports 7 to 10,
five layers and the antenna ports 7 to 11,
six layers and the antenna ports 7 to 12,
seven layers and the antenna ports 7 to 13, and
eight layers and the antenna ports 7 to 14.

5. The method according to claim 1, wherein before sending the downlink control information to the user equipment, the method further includes:
sending a radio resource control (RRC) message to the user equipment, the RRC message indicating an orthogonal cover code with the length of four is used in the demodulation reference signal enhancement scheme adopted by the base station, and a demodulation reference signal occupies twelve physical resource elements.

6. A method of configuring downlink control information in user equipment, the downlink control information indicating demodulation reference signal configuration information under demodulation reference signal enhancement, and the user equipment being configured with a demodulation reference signal configuration information set, the method comprising:
receiving the downlink control information from a base station, the downlink control information including a demodulation reference signal configuration index that indicates the demodulation reference signal configuration information, and the demodulation reference signal configuration information including one item in the demodulation reference signal configuration information set,
in the case of using one codebook, the demodulation reference signal configuration information set including a first combination set of one layer, the antenna port 11 or 13, and a scrambling sequence number, wherein the first combination set includes:
one layer, the antenna port 11, and a first scrambling sequence number, one layer, the antenna port 11, and a second scrambling sequence number,
one layer, the antenna port 13, and a first scrambling sequence number, and
one layer, the antenna port 13, and a second scrambling sequence number;
in the case of using two codebooks, the demodulation reference signal configuration information set including a second combination set of 2, 3 or four layers, at least one of the antenna ports 7, 8, 11, or 13, and a scrambling sequence number, wherein the second combination set includes:
two layers, the antenna ports 11 and 13, and a first scrambling sequence number,
two layers, the antenna ports 11 and 13, and a second scrambling sequence number,
three layers, the antenna ports 7, 8, and 11, and a first scrambling sequence number,
three layers, the antenna ports 7, 8, and 11, and a second scrambling sequence number,
four layers, the antenna ports 7, 8, 11, and 13, and a first scrambling sequence number, and
four layers, the antenna ports 7, 8, 11 and 13, and a second scrambling sequence number.

7. The method according to claim 6, wherein in the case of using one codebook, the demodulation reference signal configuration information set further includes:
one layer, the antenna port 7, and a first scrambling sequence number, indication information,
one layer, the antenna port 7, and a second scrambling sequence number, indication information,
one layer, the antenna port 8, and a first scrambling sequence number, indication information, and
one layer, the antenna port 8, and a second scrambling sequence number, indication information;
wherein in the case of using two codebooks, the demodulation reference signal configuration information set further includes:
two layers, the antenna ports 7 and 8, and a first scrambling sequence number, indication information, and
two layers, the antenna ports 7 and 8, and a second scrambling sequence number, indication information; and
wherein the indication information indicates the user equipment to use an orthogonal cover code with the length of four to perform channel estimation, and wherein in the case of using one codebook, the demodulation reference signal configuration information set further includes:
one layer, the antenna port 7', and a first scrambling sequence number,
one layer, the antenna port 7', and a second scrambling sequence number,
one layer, the antenna port 8', and a first scrambling sequence number, and
one layer, the antenna port 8', and a second scrambling sequence number;
wherein in the case of using two codebooks, the demodulation reference signal configuration information set further includes:
two layers, the antenna ports 7' and 8', and a first scrambling sequence number, and
two layers, the antenna ports 7' and 8', and a second scrambling sequence number; and
wherein the location of the antenna port 7' is the same as the location of the antenna port 7, the location of the antenna port 8' is the same as the location of the antenna port 8, and the antenna port 7' and the antenna port 8' indicate the user equipment to use orthogonal cover code with the length of four to perform channel estimation, respectively.

8. The method according to claim 6, wherein in the case of using one codebook, the demodulation reference signal configuration information set further includes:
one layer, the antenna port 7, a first scrambling sequence number,
one layer, the antenna port 7, a second scrambling sequence number,
one layer, the antenna port 8, a first scrambling sequence number,
one layer, the antenna port 8, a second scrambling sequence number,
two layers, the antenna ports 7 and 8,
three layers, the antenna ports 7 to 9, and
four layers, the antenna ports 7 to 10; and
wherein in the case of using two codebooks, the demodulation reference signal configuration information set further includes:
three layers and the antenna ports 7 to 9,
four layers and the antenna ports 7 to 10,
five layers and the antenna ports 7 to 11,
six layers and the antenna ports 7 to 12,
seven layers and the antenna ports 7 to 13, and
eight layers and the antenna ports 7 to 14.

9. The method according to claim 6, wherein before receiving the downlink control information from the base station, the method further includes:
receiving a radio resource control (RRC) message from the base station, which indicates orthogonal cover code with the length of four is used in the demodulation reference signal enhancement scheme adopted by the base station, and a demodulation reference signal occupies twelve physical resource elements.

10. A method of configuring downlink control information in a base station, the downlink control information indicating demodulation reference signal configuration information under demodulation reference signal enhancement, and the base station being configured with a demodulation reference signal configuration information set, the method comprising:
sending the downlink control information to user equipment, the downlink control information including a demodulation reference signal configuration index that indicates the demodulation reference signal configuration information, and the demodulation reference signal configuration information including one item in the demodulation reference signal configuration information set;
in the case of using one codebook, the demodulation reference signal configuration information set including a first combination set of one layer, the antenna port 9 or 10 and a scrambling sequence number, wherein the first combination set includes:
one layer, the antenna port 9, and a first scrambling sequence number,
one layer, the antenna port 9, and a second scrambling sequence number,
one layer, the antenna port 10, and a first scrambling sequence number, and
one layer, the antenna port 10, and a second scrambling sequence number;
in the case of using two codebooks, the demodulation reference signal configuration information set including a second combination set of 2, 3 or four layers, at least one of the antenna ports 7, 8, 9 and 10 and a scrambling sequence number, wherein the second combination set includes:
two layers, the antenna ports 9 and 10, and a first scrambling sequence number,
two layers, the antenna ports 9 and 10, and a second scrambling sequence number,
three layers, the antenna ports 7 to 9, and a first scrambling sequence number,
three layers, the antenna ports 7 to 9, and a second scrambling sequence number,
four layers, the antenna ports 7 to 10, and a first scrambling sequence number, and
four layers, the antenna ports 7 to 10, and a second scrambling sequence number.

11. A method of configuring downlink control information in user equipment, the downlink control information indicating demodulation reference signal configuration information under demodulation reference signal enhancement, and the user equipment being configured with a demodulation reference signal configuration information set, the method comprising:
receiving the downlink control information from a base station, the downlink control information including a demodulation reference signal configuration index that indicates the demodulation reference signal configuration information, and the demodulation reference signal configuration information including one item in the demodulation reference signal configuration information set,
in the case of using one codebook, the demodulation reference signal configuration information set including a first combination set of one layer, the antenna port 9 or 10 and a scrambling sequence number, wherein the first combination set includes:
one layer, the antenna port 9, and a first scrambling sequence number,
one layer, the antenna port 9, and a second scrambling sequence number,
one layer, the antenna port 10, and a first scrambling sequence number, and
one layer, the antenna port 10, and a second scrambling sequence number;
in the case of using two codebooks, the demodulation reference signal configuration information set including a second combination set of 2, 3 or four layers, at least one of the antenna ports 7, 8, 9 and 10 and a scrambling sequence number, wherein the second combination set includes:
two layers, the antenna ports 9 and 10, and a first scrambling sequence number,
two layers, the antenna ports 9 and 10, and a second scrambling sequence number,
three layers, the antenna ports 7 to 9, and a first scrambling sequence number,
three layers, the antenna ports 7 to 9, and a second scrambling sequence number,
four layers, the antenna ports 7 to 10, and a first scrambling sequence number, and
four layers, the antenna ports 7 to 10, and a second scrambling sequence number.

12. A method of configuring downlink control information in a base station, the downlink control information indicating demodulation reference signal configuration information under demodulation reference signal enhancement, and the base station being configured with a demodulation reference signal configuration information set, the method comprising:
sending the downlink control information to user equipment, the downlink control information including a demodulation reference signal configuration index that indicates the demodulation reference signal configuration information, and the demodulation reference signal configuration information including one item in the demodulation reference signal configuration information set,
in the case of using one codebook, the demodulation reference signal configuration information set including:
a first combination set of one layer, the antenna port 7, 8, 9, 10, 11, 12, 13, or 14, and a first scrambling sequence number,
any five items in a second combination set of one layer, the antenna port 7, 8, 9, 10, 11, 12, 13, or 14, and a second scrambling sequence number, and
a third combination set of two, three, or four layers, at least one of the antenna ports 7, 8, 9, or 10;
in the case of using two codebooks, the demodulation reference signal configuration information set including a fourth combination set of two, three, four, five, six, seven, or eight layers, at least one of the antenna ports 7, 8, 9, 10, 11, 12, 13, and 14, and a scrambling sequence number, wherein the first combination set includes:
one layer, the antenna port 7, and a first scrambling sequence,
one layer, the antenna port 8, and a first scrambling sequence,
one layer, the antenna port 9, and a first scrambling sequence,
one layer, the antenna port 10, and a first scrambling sequence,
one layer, the antenna port 11, and a first scrambling sequence,
one layer, the antenna port 12, and a first scrambling sequence,
one layer, the antenna port 13, and a first scrambling sequence, and
one layer, the antenna port 14, and a first scrambling sequence,
wherein the second combination set includes:
one layer, the antenna port 7, and a second scrambling sequence,
one layer, the antenna port 8, and a second scrambling sequence,
one layer, the antenna port 9, and a second scrambling sequence,
one layer, the antenna port 10, and a second scrambling sequence,
one layer, the antenna port 11, and a second scrambling sequence,
one layer, the antenna port 12, and a second scrambling sequence,
one layer, the antenna port 13, and a second scrambling sequence, and
one layer, the antenna port 14, and a second scrambling sequence,
wherein the third combination set includes:
two layers and the antenna ports 7 and 8,
three layers and the antenna ports 7 to 9, and
four layers and the antenna ports 7 to 10, wherein the fourth combination set includes:
two layers, the antenna ports 7 and 8, and a first scrambling sequence number,
two layers, the antenna ports 7 and 8, and a second scrambling sequence number,
two layers, the antenna ports 9 and 10, and a first scrambling sequence number,
two layers, the antenna ports 9 and 10, and a second scrambling sequence number,
two layers, the antenna ports 11 and 13, and a first scrambling sequence number,
two layers, the antenna ports 11 and 13, and a second scrambling sequence number,
two layers, the antenna ports 12 and 14, and a first scrambling sequence number,
two layers, the antenna ports 12 and 14, and a second scrambling sequence number,
three layers and the antenna ports 7 to 9,
four layers and the antenna ports 7 to 10,
five layers and the antenna ports 7 to 11,
six layers and the antenna ports 7 to 12,
seven layers and the antenna ports 7 to 13,
eight layers and the antenna ports 7 to 14, and three layers, the antenna ports 7, 8, and 11 and three layers, the antenna ports 9, 10, and 12 or four layers, the antenna ports 7, 8, 11, and 13 and four layers, the antenna ports 9, 10, 12 and 14.

13. A method of configuring downlink control information in user equipment, the downlink control information indicating demodulation reference signal configuration information under demodulation reference signal enhancement, and the user equipment being configured with a demodulation reference signal configuration information set, the method comprising:
receiving the downlink control information from a base station, wherein the downlink control information includes a demodulation reference signal configuration index, which indicates the demodulation reference signal configuration information, and the demodulation reference signal configuration information includes one item in the demodulation reference signal configuration information set,
in the case of using one codebook, the demodulation reference signal configuration information set including:
a first combination set of one layer, the antenna port 7, 8, 9, 10, 11, 12, 13, or 14, and a first scrambling sequence number;
any five items in a second combination set of one layer, the antenna port 7, 8, 9, 10, 11, 12, 13, or 14, and a second scrambling sequence number; and
a third combination set of 2, 3 or four layers, and at least one of the antenna ports 7, 8, 9, and 10;
in the case of using two codebooks, the demodulation reference signal configuration information set including:
a fourth combination set of two, three, four, five, six, seven, or eight layers, at least one of the antenna ports 7, 8, 9, 10, 11, 12, 13, and 14, and a scrambling sequence number.

* * * * *